Feb. 17, 1942.          R. R. SEARLES          2,273,380
                         BEARING SEAL
                       Filed Dec. 7, 1938
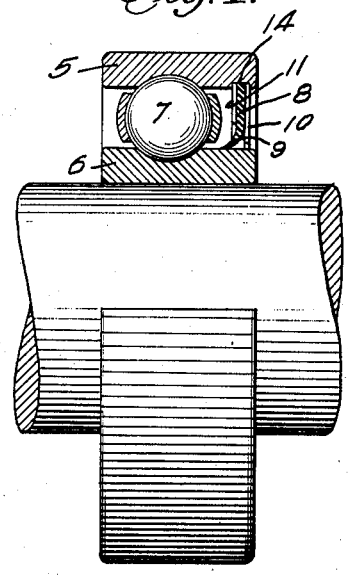
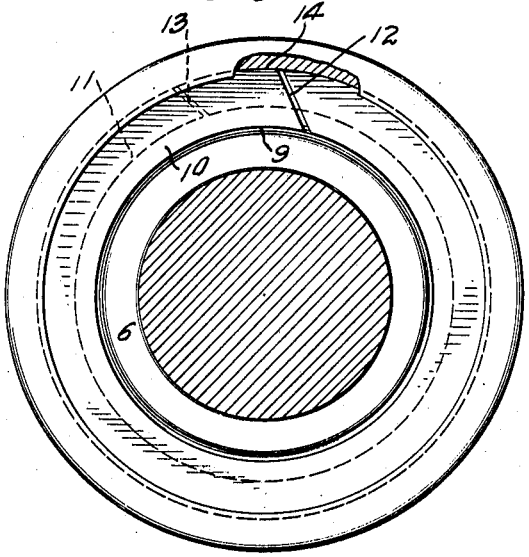
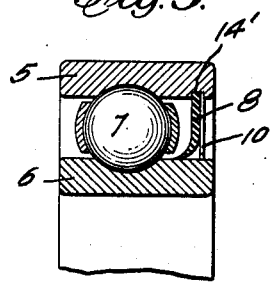
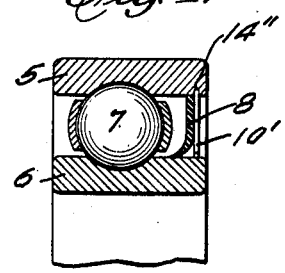
INVENTOR
RAYMOND R. SEARLES
BY
ATTORNEYS.

Patented Feb. 17, 1942

2,273,380

UNITED STATES PATENT OFFICE 2,273,380

BEARING SEAL

Raymond R. Searles, New Britain, Conn., assignor to The Fafnir Bearing Company, New Britain, Conn., a corporation of Connecticut Application December 7, 1938, Serial No. 244,342

2 Claims. (Cl. 286—5)

My invention relates to a bearing seal.

It is an object of the invention to provide an improved form of bearing seal which is simple in construction, cheap to manufacture, and effective in use.

It is another object to provide an improved annular type of seal, including yieldable sealing and stiffening members which may be handled and assembled as a unit.

In the drawing which shows, for illustrative purposes only, preferred forms of the invention—

Fig. 1 is an edge view in quarter section of an anti-friction bearing, illustrating one form of seal applied thereto;

Fig. 2 is an end view of the bearing shown in Fig. 1, part being broken away;

Fig. 3 is a fragmentary view similar to Fig. 1, illustrating a modification;

Fig. 4 is a view similar to Fig. 3, illustrating a further modification.

In the drawing, the anti-friction bearing includes an outer bearing ring 5, an inner bearing ring 6, with interposed anti-friction bearing members such as balls 7.

My improved seal means is designed to enclose the space between the two bearing rings at one or both sides of the anti-friction bearing members.

In the form shown in Figs. 1 and 2, the seal means includes a flat, annular disk 8 of yieldable material, preferably formed of artificial rubber, and may be formed of a material known to the trade as "Thiokol." The annular disk 8 is slightly wider than the space between the two bearing rings and the inner portion is tapered towards its inner edge as indicated at 9 so as to render the same progressively more resilient as the inner edge is approached. When in place as shown in the drawing, the inner edge of the annular disk 8 is flexed transversely inwardly and bears lightly and flatwise against the outer surface of the inner bearing ring. The annular disk 8 in the form shown in Figs. 1 and 2 is stiffened by a pair of stiffening plates 10—11 at opposite sides of the disk 8. The stiffening disks 10—11 are made of any suitable material, preferably sheet metal, and are permanently secured to oppostie sides of the disk 8 by vulcanizing or cementing, or by means of mechanical fasteners such as rivets, clips, or the like. The ring 10 is split transversely as indicated at 12, and the ring 11 is split transversely as indicated at 13. It will usually be preferable to space the splits 12—13 quite close together circumferentially and even in registry with each other so that the unitary assemblage of disks 8—10—11 may be compressed circumferentially for ready insertion in the annular groove 14 formed in the inner surface of the outer bearing ring 5. As illustrated, the outer stiffening disk 10 extends substantially completely across the space between the two bearing rings, while the inner stiffening disk 11 is substantially narrower, thus giving the tapered end 9 of the sealing disk greater freedom of action in flexing transversely.

In the form shown in Fig. 3, the sealing disk 8 may be the same as that heretofore described and a single stiffening disk 11 is permanently secured thereto as heretofore indicated. The groove 14' in the outer ring is slightly narrower so as to just accommodate the outer edges of the sealing disk 8 and split stiffening ring 10.

In the form shown in Fig. 4, the sealing disk 8 is the same as that heretofore described and the stiffening disk 10' is permanently secured to the outer face thereof and extends substantially completely across the space between the two rings. The groove 14" in the outer bearing ring is of a width to just accommodate the outer edge of the stiffened disk 10' and the outer edge of the sealing disk 8 simply abuts against the inner face of the outer bearing ring 5.

In all forms of the invention it will be clear that the entire seal is of unitary construction and may be handled and applied as a unit. That is a substantial advantage. The seal disk while being of yielding material and having all of the advantages inherent therein is properly stiffened and protected by one or more stiffening annular disks permanently secured thereto. The stiffen- disk or disks being split transversely are readily compressible for the purpose of assembling with the bearing ring and the action of the stiffening ring is enhanced by the resiliency of the sealing ring and the entire seal will be quite rigidly held in place.

While the invention has been described in considerable detail and preferred forms illustrated, it is to be understood that various changes and modifications may be made within the scope of the invention as defined in the appended claims.

I claim:

1. A seal means for an anti-friction bearing including inner and outer bearing rings with interposed anti-friction bearing members, said outer ring having an annular groove on the inner face thereof, said seal means including an annular disk of yielding material, a pair of annular stiffening disks permanently secured to said annular sealing disk, said stiffening disks being split transversely whereby the same are rendered contractible, the outer of said stiffening disks extending substantially across the space between said inner and outer bearing rings, the inner of said stiffening disks being narrower than the outer of said stiffening disks, said sealing disk being flexed transversely and engaged with the outer surface of said inner bearing ring, said sealing disk and stiffening disks being unitary and resiliently held in said groove.

2. A seal means for an anti-friction bearing including inner and outer bearing rings with interposed anti-friction bearing members, said outer ring having an annular groove on the inner face thereof, said seal means including a yielding annular sealing disk of rubber-like material, annular stiffening disks at the opposite sides of seal sealing disk, at least one of said stiffening disks being permanently secured to said sealing disk, the outer of said stiffening disks being split transversely to render the same radially contractible, all of said disks being seated in said annular groove, one of said stiffening disks extending substantially across the space between said rings, the other of said stiffening disks terminating substantially short of the outer face of said inner ring, said sealing disk at its inner edge being flexed transversely about the inner edge of said last mentioned stiffening disk and into sealing engagement with said inner bearing ring.

RAYMOND R. SEARLES.